US009640306B2

(12) United States Patent
Skårman et al.

(10) Patent No.: US 9,640,306 B2
(45) **Date of Patent: *May 2, 2017**

(54) FERROMAGNETIC POWDER COMPOSITION AND METHOD FOR ITS PRODUCTION

(75) Inventors: Björn Skårman, Höganäs (SE); Zhou Ye, Lerberget (SE)

(73) Assignee: HOGANAS AB (PUBL), Hoganas (SE)

( * ) Notice: Subject to any disclaimer, the term of this patent is extended or adjusted under 35 U.S.C. 154(b) by 1143 days.

This patent is subject to a terminal disclaimer.

(21) Appl. No.: 13/395,582

(22) PCT Filed: Sep. 14, 2010

(86) PCT No.: PCT/EP2010/063448

§ 371 (c)(1), (2), (4) Date: Mar. 30, 2012

(87) PCT Pub. No.: WO2011/032931

PCT Pub. Date: Mar. 24, 2011

(65) Prior Publication Data

US 2012/0211693 A1 Aug. 23, 2012

Related U.S. Application Data

(60) Provisional application No. 61/243,715, filed on Sep. 18, 2009.

(30) Foreign Application Priority Data

Sep. 18, 2009 (SE) ...................................... 0901200

(51) Int. Cl.

| | |
|---|---|
| ***H01F 1/01*** | (2006.01) |
| ***C04B 35/645*** | (2006.01) |
| ***H01F 1/24*** | (2006.01) |
| ***B22F 1/00*** | (2006.01) |
| ***B22F 1/02*** | (2006.01) |
| ***H01F 41/02*** | (2006.01) |

(52) U.S. Cl.

CPC .............. *H01F 1/24* (2013.01); *B22F 1/0062* (2013.01); *B22F 1/02* (2013.01); *H01F 41/0246* (2013.01)

(58) Field of Classification Search

None

See application file for complete search history.

(56) References Cited

U.S. PATENT DOCUMENTS

| | | | | |
|---|---|---|---|---|
| 4,572,867 | A * | 2/1986 | Nakamura ............. | G11B 5/714 252/62.54 |
| 4,601,765 | A | 7/1986 | Soileau et al. | |
| 4,985,089 | A * | 1/1991 | Yoshizawa et al. .......... | 148/303 |
| 5,069,973 | A * | 12/1991 | Saito et al. .................. | 428/421 |
| 6,149,704 | A | 11/2000 | Moro et al. | |
| 6,309,748 | B1 | 10/2001 | Lashmore et al. | |
| 6,348,265 | B1 | 2/2002 | Jansson et al. | |
| 7,235,208 | B2 | 6/2007 | Moro | |
| 2002/0073803 | A1* | 6/2002 | Narasimhan et al. .......... | 75/252 |
| 2002/0108468 | A1* | 8/2002 | Uenosono ....................... | 75/252 |
| 2004/0126609 | A1* | 7/2004 | Ueta et al. .................... | 428/570 |
| 2004/0191519 | A1 | 9/2004 | Kejzelman et al. | |
| 2006/0147177 | A1* | 7/2006 | Jing et al. ..................... | 385/147 |
| 2007/0132113 | A1* | 6/2007 | Hinterman .................... | 257/791 |
| 2008/0044679 | A1 | 2/2008 | Maeda et al. | |
| 2009/0191421 | A1* | 7/2009 | Huang et al. ................. | 428/570 |
| 2010/0239879 | A1* | 9/2010 | Kawano .................... | B22F 1/02 428/570 |
| 2010/0266861 | A1 | 10/2010 | Tajima et al. | |

FOREIGN PATENT DOCUMENTS

| | | | |
|---|---|---|---|
| EP | 0 205 786 | A1 | 12/1986 |
| JP | 2006-024869 | A | 1/2006 |
| JP | 2006-233295 | A | 9/2006 |
| JP | 2006-245183 | A | 9/2006 |
| JP | 2007-088156 | A | 4/2007 |
| JP | 2007-129154 | A | 5/2007 |
| WO | WO 2009/057675 | A1 | 5/2009 |
| WO | WO 2009/116938 | A1 | 9/2009 |

OTHER PUBLICATIONS

English Translation of Toshio et al. (JP 2006-169618), Jun. 2006.*
International Search Report (PCT/ISA/210) issued on Oct. 7, 2010, by European Patent Office as the International Searching Authority for International Application No. PCT/EP2010/063448.
Written Opinion (PCT/ISA/237) issued on Oct. 7, 2010, by European Patent Office as the International Searching Authority for International Application No. PCT/EP2010/063448.

* cited by examiner

*Primary Examiner* — Ronak Patel
(74) *Attorney, Agent, or Firm* — Buchanan Ingersoll & Rooney P.C.

(57) ABSTRACT

A ferromagnetic powder composition is provided comprising soft magnetic iron-based core particles having an apparent density of 3.2-3.7 g/ml, and wherein the surface of the core particles is provided with a phosphorus-based inorganic insulating layer and at least one metal-organic layer, located outside the first phosphorus-based inorganic insulating layer. A process further is provided for producing the composition and a method for the manufacturing of soft magnetic composite components prepared from the composition, as well as the obtained component.

22 Claims, No Drawings

FERROMAGNETIC POWDER COMPOSITION AND METHOD FOR ITS PRODUCTION

FIELD OF THE INVENTION

The present invention relates to a powder composition comprising an electrically insulated iron-based powder and to a process for producing the same. The invention further concerns a method for the manufacturing of soft magnetic composite components prepared from the composition, as well as the obtained component.

BACKGROUND OF THE INVENTION

Soft magnetic materials are used for applications, such as core materials in inductors, stators and rotors for electrical machines, actuators, sensors and transformer cores. Traditionally, soft magnetic cores, such as rotors and stators in electric machines, are made of stacked steel laminates. Soft Magnetic Composite (SMC) materials are based on soft magnetic particles, usually iron-based, with an electrically insulating coating on each particle. The SMC components are obtained by compacting the insulated particles using a traditional powder metallurgical (PM) compaction process, optionally together with lubricants and/or binders. By using the powder metallurgical technique it is possible to produce materials having higher degree of freedom in the design of the SMC component than by using the steel laminates, as the SMC material can carry a three dimensional magnetic flux, and as three dimensional shapes can be obtained by the compaction process.

Two key characteristics of an iron core component are its magnetic permeability and core loss characteristics. The magnetic permeability of a material is an indication of its ability to become magnetised or its ability to carry a magnetic flux. Permeability is defined as the ratio of the induced magnetic flux to the magnetising force or field intensity. When a magnetic material is exposed to a varying field, energy losses occur due to both hysteresis losses and eddy current losses. The hysteresis loss (DC-loss), which constitutes the majority of the total core losses in most motor applications, is brought about by the necessary expenditure of energy to overcome the retained magnetic forces within the iron core component. The forces can be minimized by improving the base powder purity and quality, but most importantly by increasing the temperature and/or time of the heat treatment (i.e. stress release) of the component. The eddy current loss (AC-loss) is brought about by the production of electric currents in the iron core component due to the changing flux caused by alternating current (AC) conditions. A high electrical resistivity of the component is desirable in order to minimise the eddy currents. The level of electrical resistivity that is required to minimize the AC losses is dependent on the type of application (operating frequency) and the component size.

The hysteresis loss is proportional to the frequency of the alternating electrical fields, whereas the eddy current loss is porportional to the square of the frequency. Thus, at high frequencies, the eddy current loss matters mostly and it is especially required to reduce the eddy current loss and still maintaining a low level of hysteresis loss. For applications operating at high frequencies where insulated soft magnetic powders are used it is desirable to use powders having finer particle size, as the eddy currents created can be restricted to a smaller volume provided the electrical insulation of the individual powder particles is sufficient (inner-particle Eddy currents). Thus, fine powders as well as high electrical resistivity will become more important for components working at high frequency. Independent on how well the particle insulation works there is always a part of unrestricted Eddy currents within the bulk of the component, causing loss. The bulk Eddy-current loss is proportional to the cross sectional area of the compacted part that carries magnetic flux. Thus, components having large cross sectional area that carry magnetic flux will require higher electrical resistivity in order to restrict the bulk Eddy current losses.

Insulated iron-based soft magnetic powder having an average particle size of 100-400 μm, e.g. between about 180 μm and 250 μm and less than 10% of the particles having a particle size below 45 μm (40 mesh powder) are normally used for components working at a frequency up to 1 kHz. Powders having an average particle size of 50-150 μm, e.g. between about 80 μm and 120 μm and 10-30% less than 45 μm (100 mesh powder) may be used for components working from 200 Hz up to 10 kHz, whereas components working at frequencies from 2 kHz up to 50 kHz are normally based on insulated soft magnetic powders having an average particle size about 20-75 μm, e.g. between about 30 μm and 50 μm and more than 50% is less than 45 μm (200 mesh powder). The average particle size and particle size distribution should preferably be optimized according to the requirements of the application. Thus examples of weight average particle sizes are 10-450 μm, 20-400 μm, 20-350 μm, 30-350 μm, 30-300 μm, 20-80 μm, 30-50 μm, 50-150 μm, 80-120 μm, 100-400 μm, 150-350 μm, 180-250 μm, 120-200 μm.

Research in the powder-metallurgical manufacture of magnetic core components using coated iron-based powders has been directed to the development of iron powder compositions that enhance certain physical and magnetic properties without detrimentally affecting other properties of the final component. Desired component properties include e.g. a high permeability through an extended frequency range, low core losses, high saturation induction, and high mechanical strength. The desired powder properties further include suitability for compression moulding techniques, which means that the powder can be easily moulded to a high density component, which can be easily ejected from the moulding equipment without damages on the component surface.

Examples of published patents are outlined below.

U.S. Pat. No. 6,309,748 to Lashmore describes a ferromagnetic powder having a diameter size of from about 40 to about 600 microns and a coating of inorganic oxides disposed on each particle.

U.S. Pat. No. 6,348,265 to Jansson teaches an iron powder coated with a thin phosphorous and oxygen containing coating, the coated powder being suitable for compaction into soft magnetic cores which may be heat treated.

U.S. Pat. No. 4,601,765 to Soileau teaches a compacted iron core which utilizes iron powder which first is coated with a film of an alkali metal silicate and then over-coated with a silicone resin polymer.

U.S. Pat. No. 6,149,704 to Moro describes a ferromagnetic powder electrically insulated with a coating of a phenol resin and/or silicone resin and optionally a sol of titanium oxide or zirconium oxide. The obtained powder is mixed with a metal stearate lubricant and compacted into a dust core.

U.S. Pat. No. 7,235,208 to Moro teaches a dust core made of ferromagnetic powder having an insulating binder in which the ferromagnetic powder is dispersed, wherein the insulating binder comprises a trifunctional alkyl-phenyl silicone resin and optionally an inorganic oxide, carbide or nitride.

Further documents within the field of soft-magnetics are Japanese patent application JP 2005-322489, having the publication number JP 2007-129154, to Yuuichi; Japanese patent application JP 2005-274124, having the publication number JP 2007-088156, to Maeda; Japanese patent application JP 2004-203969, having the publication no JP 2006-0244869, to Masaki; Japanese patent application 2005-051149, having the publication no 2006-233295, to Ueda and Japanese patent application 2005-057193, having the publication no 2006-245183, to Watanabe.

OBJECTS OF THE INVENTION

One object of the present invention is to provide an iron-based powder composition comprising an electrically insulated iron-based powder to be compacted into soft magnetic components with a high resistivity and a low core loss.

One object of the invention is to provide an iron-based powder composition, comprising an electrically insulated iron-based powder, to be compacted into soft magnetic components having high strength, which component can be heat treated at an optimal heat treatment temperature without the electrically insulated coating of the iron-based powder being deteriorated.

One object of the invention is to provide an iron-based powder composition comprising an electrically insulated iron-based powder, to be compacted into soft magnetic components having high strength, high maximum permeability, and high induction while minimizing hysteresis loss and keeping Eddy current loss at a low level.

One object of the invention is to provide a method for producing compacted and heat treated soft magnetic components having high strength, high maximum permeability, high induction, and low core loss, obtained by minimizing hysteresis loss while keeping Eddy current loss at a low level.

One object of the invention is to provide a method for producing the iron-based powder composition, without the need for any toxic or environmental unfavourable solvents or drying procedures.

One object is to provide a process for producing a compacted, and optionally heat treated, soft magnetic iron-based composite component having low core loss in combination with sufficient mechanical strength and acceptable magnetic flux density (induction) and maximal permeability.

SUMMARY OF THE INVENTION

To achieve at least one of the above-mentioned objects and/or further objects not mentioned, which will appear from the following description, the present invention concerns a ferromagnetic powder composition comprising soft magnetic iron-based core particles having an apparent density of 3.2-3.7 g/ml, wherein the surface of the core particles is provided with a phosphorous-based inorganic insulating layer.

Optionally, in another embodiment at least one metal-organic layer, is located outside the first phosphorous-based inorganic insulating layer, of a metal-organic compound having the following general formula:

$$R_1[(R_1)_x(R_2)_y(MO_{n-1})]_nR_1$$

wherein M is a central atom selected from Si, Ti, Al, or Zr;

O is oxygen;

$R_1$ is a hydrolysable group chosen from alkoxy groups having less than 4, preferably less than 3 carbon atoms.

$R_2$ is an organic moiety and wherein at least one $R_2$ contains at least one amino group;

wherein n is the number of repeatable units being an integer between 1 and 20;

wherein x is an integer between 0 and 1;

wherein y is an integer between 1 and 2;

A preferred embodiment according to the present invention relates to a ferromagnetic powder composition comprising soft magnetic iron-based core particles having an apparent density of 3.2-3.7 g/ml, and wherein the surface of the core particles is provided with a phosphorus-based inorganic insulating layer, and at least one metal-organic layer, located outside the first phosphorus-based inorganic insulating layer, of a metal-organic compound having the following general formula:

$$R_1[(R_1)_x(R_2)_y(MO_{n-1})]_nR_1$$

wherein M is a central atom selected from Si, Ti, Al, or Zr;

O is oxygen;

$R_1$ is a is an alkoxy group having less than 4 carbon atoms;

$R_2$ is an organic moiety and wherein at least one $R_2$ contains at least one amino group;

wherein n is the number of repeatable units being an integer between 1 and 20;

wherein the x is an integer between 0 and 1;

wherein y is an integer between 1 and 2.

In another embodiment, an additional metallic or semi-metallic particulate compound having a Mohs hardness of less than 3.5 being adhered to at least one metal-organic layer.

In yet another embodiment the powder composition comprises a particulate lubricant. The lubricant may be added to composition comprising the core particles provided with a phosphorous-based inorganic insulating layer and at least one metal-organic layer; or optionally a composition also including the metallic or semi-metallic particulate compound.

The core particles shall have an apparent density (AD) as measured according to ISO 3923-1 of 3.2-3.7 g/ml, preferably 3.3-3.7 g/ml, preferably 3.3-3.6 g/ml, more preferably in the range from above 3.3 g/ml to below or equal to 3.6 g/ml, preferably between 3.35 and 3.6 g/ml; or 3.4 and 3.6 g/m; or 3.35 and 3.55 g/ml; or between 3.4 and 3.55 g/ml.

The invention further concerns a process for the preparation of a ferromagnetic powder composition comprising coating soft magnetic iron-based core particles having an apparent density of 3.2-3.7 g/ml, or e.g. more preferable ranges mentioned above, with a phosphorous-based inorganic insulating layer so that the surface of the core particles are electrically insulated.

Optionally, in another embodiment, further comprising the steps of a) mixing said soft magnetic iron-based core particles being electrically insulated by a phosphorous-based inorganic insulating layer, with a metal-organic compound as above; and b) optionally mixing the obtained particles with a further metal-organic compound as above.

A preferred embodiment according to the present invention relates to a process for the preparation of a ferromagnetic powder composition comprising coating soft magnetic iron-based core particles having an apparent density of 3.2-3.7 g/ml with a phosphorous-based inorganic insulating layer so that the surface of the core particles are electrically insulated; and a) mixing said soft magnetic iron-based core particles insulated by a phosphorous-based inorganic insulating layer with a metal-organic compound, wherein at least one metal-organic layer is provided outside the first phosphorus-based inorganic insulating layer, of a metal-organic compound having the following general formula:

$$R_1[(R_1)_x(R_2)_y(MO_{n-1})]_nR_1$$

wherein M is a central atom selected from Si, Ti, Al, or Zr;

O is oxygen;

$R_1$ is a is an alkoxy group having less than 4 carbon atoms;

$R_2$ is an organic moiety and wherein at least one $R_2$ contains at least one amino group;

wherein n is the number of repeatable units being an integer between 1 and 20;

wherein the x is an integer between 0 and 1;

wherein y is an integer between 1 and 2; and b) optionally mixing the obtained particles with a further metal-organic compound as disclosed in a).

In another embodiment the process further comprises the step of c) mixing the powder with a metallic or semi-metallic particulate compound having a Mohs hardness of less than 3.5. Step c may optionally, in addition of after step b, be performed before step b, or instead of after step b, be performed before step b.

In yet another embodiment the process comprises the step of d) mixing the powder with a particulate lubricant. This step may be done directly after step b) if a metallic or semi-metallic particulate compound is not included in the composition.

The invention further concerns a process for the preparation of soft magnetic composite materials comprising: uniaxially compacting a composition according to the invention in a die at a compaction pressure of at least about 600 MPa; optionally pre-heating the die to a temperature below the melting temperature of the added particulate lubricant; ejecting the obtained green body; and optionally heat-treating the body. A composite component according to the invention will typically have a content of P between 0.01-0.1% by weight, a content of added Si to the base powder between 0.02-0.12% by weight, and if Bi is added in form of a metallic or semi-metallic particulate compound having a Mohs hardness of less than 3.5 the content of Bi will be between 0.05-0.35% by weight.

DETAILED DESCRIPTION OF THE INVENTION

Base Powder

The iron-based soft magnetic core particles may be of a water atomized, a gas atomized or a sponge iron powder, although a water atomized powder is preferred.

The iron-based soft magnetic core particles may be selected from the group consisting of essentially pure iron, alloyed iron Fe—Si having up to 7% by weight, preferably up to 3% by weight of silicon, alloyed iron selected from the groups Fe—Al, Fe—Si—Al, Fe—Ni, Fe—Ni—Co, or combinations thereof. Essentially pure iron is preferred, i.e. iron with inevitable impurities.

It has now also surprisingly been found that further improvement of the electrical resistivity of the compacted and heat treated component according to the invention can be obtained if base powders having less rough particle surfaces are used. Such suitable morphology is manifested e.g. by an increase in the apparent density of above 7% or above 10%, or above 12% or above 13% for an iron or iron-based powder resulting in an apparent density of 3.2-3.7 g/ml, preferably above 3.3 g/ml and below or equal to 3.6 g/ml, preferably between 3.4 and 3.6 g/ml, or between 3.35 and 3.55 g/ml. Such powders with the desired apparent density may be obtained from the gas-atomization process or water atomized powders. If water atomized powders are used, they preferably are subjected to grinding, milling or other processes, which will physically alter the irregular surface of the water atomized powders. If the apparent density of the powders is increased too much, above about 25% or above 20%, which means for a water-atomized iron based powder above about 3.7 or 3.6 g/ml the total core loss will increase.

It has also been found that the shape of the powder particles influence the results in e.g. resistivity. The use of irregular particles gives a lower apparent density and lower resistivity than if the particles are of a less uneven and smoother shape. Thus, particles being nodular, i.e. rounded irregular particles, or spherical or almost spherical particles are preferred according to the present invention.

As high resistivity will become more important for components working at high frequencies, where powders having finer particle size are preferably used (such as 100 and 200 mesh), "high AD" becomes more important for these powders. However, improved resistivity is also shown for coarser powders (40 mesh). Coarse powders normally suitable for low frequency applications (<1 kHz), can with an increased apparent density through grinding operations, or similar, obtain significant improved electrical resistivity according to the present invention. Thus, components with larger cross sectional areas for carrying magnetic flux, can be produced according to the present invention and still showing low core losses.

A composition according to the invention, containing iron-based powders, will show an apparent density close to the apparent density of the iron-based powder.

A First Coating Layer (Inorganic)

The core particles are provided with a first inorganic insulating layer, which preferably is phosphorous-based. This first coating layer may be achieved by treating iron-based powder with phosphoric acid solved in either water or organic solvents. In water-based solvent rust inhibitors and tensides are optionally added. A preferred method of coating the iron-based powder particles is described in U.S. Pat. No. 6,348,265. The phosphatizing treatment may be repeated. The phosphorous based insulating inorganic coating of the iron-based core particles is preferably without any additions such as dopants, rust inhibitors, or surfactants.

The content of phosphate in layer 1 may be between 0.01 and 0.15 wt % of the composition.

A Metal-Organic Layer (Optional Second Coating Layer)

Optionally is at lest one metal-organic layer located outside the first phosphorous-based layer. The metal-organic layer is of a metal-organic compound having the general formula:

$$R_1[(R_1)_x(R_2)_y(MO_{n-1})]_nR_1$$

wherein:

M is a central atom selected from Si, Ti, Al, or Zr;

O is oxygen;

$R_1$ is a hydrolysable group chosen from an alkoxy group having less than 4, preferably less than 3 carbon atoms;

$R_2$ is an organic moiety, which means that the $R_2$-group contains an organic part or portion, and wherein at least one $R_2$ contains at least one amino group;

wherein n is the number of repeatable units being an integer between 1 and 20;

wherein x is an integer between 0 and 1; wherein y is an integer between 1 and 2 (x may thus be 0 or 1 and y may be 1 or 2).

The metal-organic compound may be selected from the following groups: surface modifiers, coupling agents, or cross-linking agents.

$R_2$ may include 1-6, preferably 1-3 carbon atoms. $R_2$ may further include one or more hetero atoms selected from the group consisting of N, O, S and P. The $R_2$ group may be linear, branched, cyclic, or aromatic.

$R_2$ may include one or more of the following functional groups: amine, diamine, amide, imide, epoxy, hydroxyl, ethylene oxide, ureido, urethane, isocyanato, acrylate, glyceryl acrylate, benzyl-amino, vinyl-benzyl-amino.

The metal-organic compound may be selected from derivatives, intermediates or oligomers of silanes, siloxanes and silsesquioxanes, wherein the central atom consists of Si, or the corresponding titanates, aluminates or zirconates, wherein the central atom consist of Ti, Al and Zr, respectively, or mixtures thereof.

According to one embodiment at least one metal-organic compound in one metal-organic layer is a monomer (n=1).

According to another embodiment at least one metal-organic compound in one metal-organic layer is an oligomer (n=2-20).

According to another embodiment the metal-organic layer located outside the first layer is of a monomer of the metal-organic compound and wherein the outermost metal-organic layer is of an oligomer of the metal-organic compound. The chemical functionality of the monomer and the oligomer is necessary not same. The ratio by weight of the layer of the monomer of the metal-organic compound and the layer of the oligomer of the metal-organic compound may be between 1:0 and 1:2, preferably between 2:1-1:2.

If the metal-organic compound is a monomer it may be selected from the group of trialkoxy and dialkoxy silanes, titanates, aluminates, or zirconates. The monomer of the metal-organic compound may thus be selected from 3-aminopropyl-trimethoxysilane, 3-aminopropyl-triethoxysilane, 3-aminopropyl-methyl-diethoxysilane, N-aminoethyl-3-aminopropyl-trimethoxysilane, N-aminoethyl-3-aminopropyl-methyl-dimethoxysilane, 1,7-bis (triethoxysilyl)-4-azaheptan, triamino-functional propyltrimethoxysilane, 3-ureidopropyl-triethoxysilane, 3-isocyanatopropyl-triethoxysilane, tris(3-trimethoxysilylpropyl)-isocyanurate, O-(propargyloxy)-N-(triethoxysilylpropyl)-urethane, 1-aminomethyl-triethoxysilane, 1-aminoethyl-methyl-dimethoxysilane, or mixtures thereof.

An oligomer of the metal-organic compound may be selected from alkoxy-terminated alkyl-alkoxy-oligomers of silanes, titantes, aluminates, or zirconates. The oligomer of the metal-organic compound may thus be selected from methoxy, ethoxy or acetoxy-terminated amino-silsesquioxanes, amino-siloxanes, oligomeric 3-aminopropyl-methoxysilane, 3-aminopropyl/propyl-alkoxy-silanes, N-aminoethyl-3-aminopropyl-alkoxy-silanes, or N-aminoethyl-3-aminopropyl/methyl-alkoxy-silanes or mixtures thereof.

The total amount of metal-organic compound may be 0.05-0.8%, or 0.05-0.6% or 0.1-0.5%, or 0.2-0.4%, or 0.3-0.5% by weight of the composition. These kinds of metal-organic compounds may be commercially obtained from companies, such as Evonik Ind., Wacker Chemie A G, Dow Corning, Mitsubishi Int. Corp., Famas Technology Sarl, etc.

A Metal or Semi-Metallic Particulate Compound

The coated soft magnetic iron-based powder should, if used, additionally contain at least one particulate compound, a metallic or semi-metallic compound. The metallic or semi-metallic particulate compound should be soft having Mohs hardness less than 3.5 and constitute of fine particles or colloids. The compound may preferably have an average particle size below 5 μm, preferably below 3 μm, and most preferably below 1 μm. The Mohs hardness of the metallic or semi-metallic particulate compound is preferably 3 or less, more preferably 2.5 or less. $SiO_2$, $Al_2O_3$, MgO, and $TiO_2$ are abrasive and have a Mohs hardness well above 3.5 and is not within the scope of the invention. Abrasive compounds, even as nano-sized particles, cause irreversible damages to the electrically insulating coating giving poor ejection and worse magnetic and/or mechanical properties of the heat-treated component.

The metallic or semi-metallic particulate compound may be at least one selected from the groups: lead-, indium-, bismuth-, selenium-, boron-, molybdenum-, manganese-, tungsten-, vanadium-, antimony-, tin-, zinc-, cerium-based compounds.

The metallic or semi-metallic particulate compound may be an oxide, hydroxide, hydrate, carbonate, phosphate, fluorite, sulphide, sulphate, sulphite, oxychloride, or a mixture thereof. According to a preferred embodiment the metallic or semi-metallic particulate compound is bismuth, or more preferably bismuth (III) oxide.

The metallic or semi-metallic particulate compound may be mixed with a second compound selected from alkaline or alkaline earth metals, wherein the compound may be carbonates, preferably carbonates of calcium, strontium, barium, lithium, potassium or sodium.

The metallic or semi-metallic particulate compound or compound mixture may be present in an amount of 0.05-0.8%, or 0.05-0.6%, or 0.1-0.5%, or 0.15-0.4% by weight of the composition.

The metallic or semi-metallic particulate compound is adhered to at least one metal-organic layer. In one embodiment of the invention the metallic or semi-metallic particulate compound is adhered to the outermost metal-organic layer.

Lubricant

The powder composition according to the invention may optionally comprise a particulate lubricant. The particulate lubricant plays an important role and enables compaction without the need of applying die wall lubrication. The particulate lubricant may be selected from the group consisting of primary and secondary fatty acid amides, transamides (bisamides) or fatty acid alcohols. The lubricating moiety of the particulate lubricant may be a saturated or unsaturated chain containing between 12-22 carbon atoms. The particulate lubricant may preferably be selected from stearamide, erucamide, stearyl-erucamide, erucyl-stearamide, behenyl alcohol, erucyl alcohol, ethylene-bisstearmide (i.e. EBS or amide wax). The particulate lubricant may be present in an amount of 0.1-0.6%, or 0.2-0.4%, or 0.3-0.5%, or 0.2-0.6% by weight of the composition.

Preparation Process of the Composition

The process for the preparation of the ferromagnetic powder composition according to the invention comprise: coating soft magnetic iron-based core particles, produced and treated to obtain an apparent density of 3.2-3.7 g/ml, with a phosphorous-based inorganic compound to obtain a phosphorous-based inorganic insulating layer leaving the surface of the core particles being electrically insulated.

The core particles are a) mixed with a metal-organic compound as disclosed above; and b) optionally mixing the obtained particles with a further metal-organic compound as disclosed above.

Also, in an another optional step of the process is: c) mixing the powder with a metallic or semi-metallic particulate compound having a Mohs hardness of less than 3.5. Step c may optionally, in addition to after step b, be performed before step b, or instead of after step b, be performed before step b. Preferably, step c is performed between step a and b.

A further optional step of the process is: d) mixing the powder with a particulate lubricant.

The core particles provided with a first inorganic insulating layer may be pre-treated with an alkaline compound before it is being mixed with the metal-organic compound. A pre-treatment may improve the prerequisites for coupling between the first layer and second layer, which could enhance both the electrical resistivity and mechanical strength of the magnetic composite component. The alkaline compound may be selected from ammonia, hydroxyl amine, tetraalkyl ammonium hydroxide, alkyl-amines, alkyl-amides. The pre-treatment may be conducted using any of the above listed chemicals, preferably diluted in a suitable solvent, mixed with the powder and optionally dried.

Process for Producing Soft-Magnetic Components

The process for the preparation of soft magnetic composite materials according to the invention comprise: uniaxially compacting the composition according to the invention in a die at a compaction pressure of at least about 600 MPa; optionally pre-heating the die to a temperature below the melting temperature of the added particulate lubricant; optionally pre-heating the powder to between 25-100° C. before compaction; ejecting the obtained green body; and optionally heat-treating the body.

The heat-treatment process may be in vacuum, non-reducing, inert, $N_2/H_2$ or in weakly oxidizing atmospheres, e.g. 0.01 to 3% oxygen. Optionally the heat treatment is performed in an inert atmosphere and thereafter exposed quickly in an oxidizing atmosphere, such as steam, to build a superficial crust or layer of higher strength. The temperature may be up to 750° C.

The heat treatment conditions shall allow the lubricant to be evaporated as completely as possible. This is normally obtained during the first part of the heat treatment cycle, above about 150-500° C., preferably above about 250 to 500° C. At higher temperatures, the metallic or semi-metallic compound may react with the metal-organic compound and partly form a network. This would further enhance the mechanical strength, as well as the electrical resistivity of the component. At maximum temperature (550-750° C., or 600-750° C., or 630-700° C., or 630-670° C.), the compact may reach complete stress release at which the coercivity and thus the hysteresis loss of the composite material is minimized.

The compacted and heat treated soft magnetic composite material prepared according to the present invention preferably have a content of P between 0.01-0.15% by weight of the component, a content of added Si to the base powder between 0.02-0.12% by weight of the component, and if Bi is added in form of a metallic or semi-metallic particulate compound having a Mohs hardness of less than 3.5, the content of Bi will be between 0.05-0.35% by weight of the component.

EXAMPLES

The invention is further illustrated by the following examples. Examples 1-4 disclose the build up of soft magnetic powder compositions without the specific apparent density of the present invention and illustrate the procedure for the following examples 5-7 according to the present invention.

Example 1

Example 1 illustrates the impact from different coating layers and the impact from addition of a metallic or semi-metallic particulate compound on magnetic, electric and mechanical properties on compacted and heat treated parts produced from a 40 mesh iron powder having an apparent density of 3.0 g/ml.

An iron-based water atomised powder having an average particle size of about 220 μm and less than 5% of the particles having a particle size below 45 μm (40 mesh powder). This powder, which is a pure iron powder, was first provided with an electrical insulating thin phosphorus-based layer (phosphorous content being about 0.045% per weight of the coated powder.) Thereafter it was mixed by stirring with 0.2% by weight of an oligomer of an aminoalkyl-alkoxy silane (Dynasylan®1146, Evonik Ind.). The composition was further mixed with 0.2% by weight of a fine powder of bismuth (III) oxide. Corresponding powders without surface modification using silane and bismuth, respectively, were used for comparison (A3, A4, A5). The powders were finally mixed with a particulate lubricant, EBS, before compaction. The amount of the lubricant used was 0.3% by weight of the composition.

Magnetic toroids with an inner diameter of 45 mm and an outer diameter of 55 mm and a height of 5 mm were uniaxially compacted in a single step at two different compaction pressures 800 and 1100 MPa, respectively; die temperature 60° C. After compaction the parts were heat treated at 650° C. for 30 minutes in nitrogen. Reference materials A6 and A8 were treated at 530° C. for 30 minutes in air and reference material A7 was treated at 530° C. for 30 minutes in steam. The obtained heat treated toroids were wound with 100 sense and 100 drive turns. The magnetic measurements were measured on toroid samples having 100 drive and 100 sense turns using a Brockhaus hysterisisgraph. The total core loss was measured at 1 Tesla, 400 Hz and 1000 Hz, respectively. Transverse Rupture Strength (TRS) was measured according to ISO 3995. The specific electrical resistivity was measured on the ring samples by a four point measuring method.

The following table 1 demonstrates the obtained results:

TABLE 1

| Sample | Density ($g/cm^3$) | Resistivity (μOhm · m) | B @ 10 kA/m (T) | Maximal Permeability | Core loss/cycle @ 1 T and 200 Hz (W/kg) | DC-Loss/cycle @ 1 T and 1 kHz (W/kg) | Core loss/cycle @ 1 T and 1 kHz (W/kg) | TRS (MPa) |
|---|---|---|---|---|---|---|---|---|
| A1. (800 MPa) | 7.47 | 480 | 1.54 | 580 | 16 | 71 | 108 | 60 |
| A2. (1100 MPa) | 7.56 | 530 | 1.59 | 610 | 14 | 68 | 105 | 60 |

TABLE 1-continued

| Sample | Density ($g/cm^3$) | Resistivity (μOhm · m) | B @ 10 kA/m (T) | Maximal Permeability | Core loss/cycle @ 1 T and 200 Hz (W/kg) | DC-Loss/cycle @ 1 T and 1 kHz (W/kg) | Core loss/cycle @ 1 T and 1 kHz (W/kg) | TRS (MPa) |
|---|---|---|---|---|---|---|---|---|
| A3. Without phosphate (1100 MPa) | 7.57 | 65 | 1.61 | 650 | 23 | 69 | 124 | 65 |
| A4. Without Resin (1100 MPa) | 7.57 | 100 | 1.60 | 570 | 17 | 68 | 116 | 40 |
| A5. Without $Bi_2O_3$ (1100 MPa) | 7.57 | 120 | 1.60 | 580 | 17 | 69 | 116 | 70 |
| A6. Somaloy ® 700 (0.4% Kenolube ®; 800 MPa) | 7.48 | 400 | 1.53 | 650 | 20 | 97 | 131 | 41 |
| A7. Somaloy ® 3P (0.3% Lube*; 1100 MPa) | 7.63 | 290 | 1.64 | 750 | 21 | 94 | 132 | 100 |
| A8. Somaloy ® 3P (0.3% Lube*; 1100 MPa) | 7.63 | 320 | 1.65 | 680 | 19 | 88 | 124 | 60 |

*Lube: the lubricating system of Somaloy ® 3P materials.

The magnetic and mechanical properties are negatively affected if one or more of the coating layers are excluded. Leaving out the phosphate-based layer will give lower electrical resistivity, thus high core loss (Eddy current losses) (A3). Leaving out the metal-organic compound will either give lower electrical resistivity or lower mechanical strength (A4, A5).

lower purity and larger particle size (>98 wt %; $D_{50}$~5 μm). The powders were finally mixed with different amounts of amide wax (EBS) before compaction at 1100 MPa. The powder compositions were further processed as described in example 1. The results are displayed in table 2 and show the effect on the magnetic properties and mechanical strength (TRS).

TABLE 2

| Sample | Tot. metal-organic compound (wt %) | $Bi_2O_3$ (wt %) | EBS (wt %) | Density (g/cm3) | Resistivity (μΩ · m) | B @ 10 kA/m (T) | Max Permeability | AC-loss @ 1 T, 1 kHz (W/kg) | DC-loss @ 1 T and 1 kHz (W/kg) | TRS (MPa) |
|---|---|---|---|---|---|---|---|---|---|---|
| C1 | 0.10 | 0.10 | 0.20 | 7.67 | 80 | 1.65 | 650 | 54 | 68 | 28 |
| C2 | 0.30 | 0.10 | 0.20 | 7.61 | 180 | 1.62 | 600 | 48 | 70 | 33 |
| C3 | 0.30 | 0.30 | 0.20 | 7.62 | 230 | 1.61 | 590 | 39 | 71 | 55 |
| C4 | 0.30 | 0.30 | 0.40 | 7.50 | 1200 | 1.52 | 410 | 38 | 82 | 53 |
| C5 | 0.20 | 0.20 | 0.30 | 7.57 | 620 | 1.59 | 620 | 35 | 68 | 60 |
| C6 | 0.20 | 0.20 | 0.30 | 7.57 | 220 | 1.60 | 570 | 41 | 68 | 65 |

As compared to existing commercial reference material, such as Somaloy®700 or Somaloy®3P obtained from Höganäs AB, Sweden (A6-A8), the composite materials A1 and A2 can be heat treated at a higher temperature thereby decreasing the hysteresis loss (DC-loss/cycle) considerably.

Example 2

Example 2 illustrates the impact from different amounts of a double metal-organic coating layer, and the impact from different added amounts of a metallic or semi-metallic particulate compound on magnetic, electric and mechanical properties on compacted and heat treated parts produced from a 40 mesh iron powder having an apparent density of about 3.0 g/ml.

The same base powder as in example 1 was used having the same phophorous-based insulating layer. This powder was mixed by stirring with different amounts of first a basic aminoalkyl-alkoxy silane (Dynasylan®Ameo) and thereafter with an oligomer of an aminoalkyl/alkyl-alkoxy silane (Dynasylan®1146), using a 1:1 relation, both produced by Evonik Ind. The composition was further mixed with different amounts of a fine powder of bismuth (III) oxide (>99 wt %; $D_{50}$~0.3 μm). Sample C6 is mixed with a $Bi_2O_3$ with The samples C1 to C5 illustrate the effect of using different amounts of metal-organic compound, bismuth oxide, or lubricant. In sample C6 the electrical resistivity is lower, but the TRS is slightly improved, as compared to sample C5.

Example 3

Example 3 illustrates the impact from different amounts and types of single or double metal-organic coating layers, and the impact from different added amounts of a metallic or semi-metallic particulate compound on magnetic, electric and mechanical properties on compacted and heat treated parts produced from a 40 mesh iron powder having an apparent density of about 3.0 g/ml.

The same base powder as in example 1 was used having the same phophorous-based insulating layer, except for samples D10 (0.06 wt % P) and D11 (0.015 wt % P). The powder samples D1 to D11 were further treated according to table 3. All samples were finally mixed with 0.3 wt % EBS and compacted to 800 MPa. The soft magnetic components were thereafter heat treated at 650° C. for 30 minutes in nitrogen.

Sample D1 to D3 illustrate that either the first or second metal-organic layer (2:1 or 2:2) can be omitted, but the best results will be obtained by combining both layers. Sample D4 and D5 illustrate pre-treated powders using diluted ammonia followed by drying at 120° C., 1 h in air. The pre-treated powders were further mixed with amino-functional oligomeric silanes, giving acceptable properties.

The samples D10 and D11 illustrate the effect of the phosphorous content of layer 1. Dependent on the properties of the base powder, such as particle size distribution and particle morphology, there is an optimum phosphorous concentration (between 0.01 and 0.15 wt %). Table 3 shows the obtained results.

TABLE 3

| No | Metal-organic compound (layer 2:1) | Amount per weight | Metal-organic compound (layer 2:2) | Amount per weight | Metallic or semi-metallic particulate compound | Amount per weight | Density | Resistivity | Max permability | TRS (MPa) |
|---|---|---|---|---|---|---|---|---|---|---|
| D1 | aminopropyl-trialkoxysilane | 0.15% | Oligomer of aminopropyl/propyl-alkoxysilane | 0.15% | $Bi_2O_3$ (>99%, D50 0.3 μm) | 0.2% | 7.47 | 700 | 560 | 62 |
| D2 | No | 0% | Oligomer of aminopropyl/propyl-alkoxysilane | 0.3% | $Bi_2O_3$ (>99%, D50 0.3 μm) | 0.2% | 7.47 | 500 | 540 | 55 |
| D3 | aminopropyl-trialkoxysilane | 0.3% | No | 0% | $Bi_2O_3$ (>99%, D50 0.3 μm) | 0.2% | 7.47 | 700 | 550 | 53 |
| D4 | Pre-treatment* | 0% | Oligomer of aminopropyl/propyl-alkoxysilane | 0.3% | $Bi_2O_3$ (>99%, D50 0.3 μm) | 0.2% | 7.47 | 500 | 530 | 60 |
| D5 | Pre-treatment* AND 0.15% MTMS***** | 0.15% | Oligomer of aminopropyl/propyl-alkoxysilane | 0.15% | $Bi_2O_3$ (>99%, D50 0.3 μm) | 0.2% | 7.47 | 450 | 535 | 60 |
| D6 | Vinyl-triethoxysilane | 0.15% | Oligomer of aminopropyl/propyl-alkoxysilane | 0.15% | $Bi_2O_3$ (>99%, D50 0.3 μm) | 0.2% | 7.47 | 140 | 450 | 43 |
| D7 | Aminopropyl-trialkoxysilane | 0.15% | Oligomer of propyl-alkoxysilan or diethoxy-silane | 0.15% | $Bi_2O_3$ (>99%, D50 0.3 μm) | 0.2% | 7.42 | 160 | 480 | 55 |
| D8** | vinyl-triethoxysilane | 0.15% | Oligomer of vinyl/alkyl-alkoxysilane | 0.15% | $Bi_2O_3$ (>99%, D50 0.3 μm) | 0.2% | 7.41 | 26 | 350 | 21 |
| D9 | Mercaptopropyl-trialkoxysilane | 0.15% | Oligomer of aminopropyl/propyl-alkoxysilane | 0.15% | $Bi_2O_3$ (>99%, D50 0.3 μm) | 0.2% | 7.47 | 600 | 565 | 60 |
| D10*** | aminopropyl-trialkoxysilane | 0.15% | Oligomer of aminopropyl/propyl-alkoxysilane | 0.15% | $Bi_2O_3$ (>99%, D50 0.3 μm) | 0.2% | 7.46 | 350 | 525 | 61 |
| D11**** | aminopropyl-trialkoxysilane | 0.15% | Oligomer of aminopropyl/propyl-alkoxysilane | 0.15% | $Bi_2O_3$ (>99%, D50 0.3 μm) | 0.2% | 7.48 | 200 | 605 | 60 |

*Pre-treatment using $NH_3$ in acetone followed by drying at 120° C., 1 h in air.;
**not including a metal organic compound wherein $R_2$ contains at least one amino group;
***Layer 1 containing 0.06 wt % P;
****Layer 1 containing 0.015 wt % P;
*****Methyl-trimetoxy silane.

Example 4

Example 4 illustrates the impact from different amounts and types of metallic or semi-metallic particulate compounds on magnetic, electric and mechanical properties on compacted and heat treated parts produced from a 40 mesh iron powder having an apparent density of about 3.0 g/ml The same base powder as in example 1 was used having the same phophorous-based insulating layer. All three samples were processed similarly as sample D1, except for the addition of the metallic or semi-metallic particulate compound is different. Sample E1 illustrate that the electrical resistivity is improved if calcium carbonate is added in minor amount to bismuth (III) oxide. Sample E2 demonstrate the effect of another soft, metallic compound, $MoS_2$. Table 4 shows the obtained results.

TABLE 4

| No | Metal-organic compound (layer 2:1) | Amount per weight | Metal-organic compound (layer 2:2) | Amount per weight | Metallic or semi-metallic particulate compound | Amount per weight | Density | Resistivity | Max permability | TRS (MPa) |
|---|---|---|---|---|---|---|---|---|---|---|
| E1 | aminopropyl-trialkoxysilane | 0.15% | Oligomer of aminopropyl/propyl-alkoxysilane | 0.15% | $Bi_2O_3$ /$CaCO_3$ (3:1) (>99%, D50 0.3 μm) | 0.2% | 7.57 | 1050 | 560 | 65 |
| E2 | aminopropyl-trialkoxysilane | 0.15% | Oligomer of aminopropyl/propyl-alkoxysilane | 0.15% | $MoS_2$ (>99%, D50 1 μm) | 0.2% | 7.57 | 650 | 500 | 45 |

TABLE 4-continued

| No | Metal-organic compound (layer 2:1) | Amount per weight | Metal-organic compound (layer 2:2) | Amount per weight | Metallic or semi-metallic particulate compound | Amount per weight | Density | Resistivity | Max permability | TRS (MPa) |
|---|---|---|---|---|---|---|---|---|---|---|
| E3 | aminopropyl-trialkoxysilane | 0.15% | Oligomer of aminopropyl/propyl-alkoxysilane | 0.15% | $SiO_2$ (>99%, D50 0.5 μm) | 0.2% | 7.57 | 45 | 630 | 23 |

In contrast to addition of abrasive and hard compounds with Mohs hardness below 3.5, addition of abrasive and hard compounds with Mohs hardness well above 3.5, such as corundum ($Al_2O_3$) or quartz ($SiO_2$) (E3), in spite of being nano-sized particles, the soft magnetic properties and mechanical properties will be negatively influenced.

Example 5

Example 5 shows the impact from using a 40 mesh iron powder having different apparent density, within and outside the specified apparent density (AD), combined with the other features of the invention on the electric and magnetic properties of the compacted and heat treated parts. The starting powder used had an apparent density of about 3.0 g/ml.

An iron-based water atomised powder having an average particle size of about 220 μm and less than 5% of the particles having a particle size below 45 μm (40 mesh powder). This powder, which is a pure iron powder, was grinded. Three different apparent densities, i.e. 3.04, 3.32 and 3.50 g/ml, denoted E1, E2 and E3, respectively, are disclosed. The three samples were further provided with an electrical insulating thin phosphorus-based layer (phosphorous content being about 0.045% per weight of the coated powder). Thereafter, the samples were mixed by stirring with 0.3% by weight of a basic aminoalkyl-alkoxy silane (Dynasylan®Ameo) and secondly an oligomer of an aminoalkyl-alkoxy silane (Dynasylan®1146), using a 1:1 relation, both produced by Evonik Ind. The compositions were further mixed with 0.2% by weight of a fine powder of bismuth (III) oxide (>98 wt %; D50~5 μm). The compositions were further mixed with amide wax (EBS) using 0.3% by weight and processed as described in example 1 using 1100 MPa; die temperature 60° C. The heat treatment was made at 650° C. for 30 minutes in nitrogen. Testing was performed according to example 1. Table 5 shows the obtained results.

TABLE 5

| Samples | AD (g/ml) | Ring Density (g/cm3) | Ring Resistivity (μOhm * m) | B @ 10 kA/m (T) | Core loss @ 1 T and 200 Hz (W/kg) | Core loss @ 1 T and 1 kHz (W/kg) Cross section* 5 × 5 mm | Core loss @ 1 T and 2 kHz (W/kg) Cross section* 5 × 5 mm | Core loss @ 1 T and 1 kHz (W/kg) Cross section* 20 × 20 mm |
|---|---|---|---|---|---|---|---|---|
| E1 | 3.04 | 7.56 | 530 | 1.59 | 14.0 | 105.0 | 215.0 | 132.0 |
| E2 | 3.32 | 7.56 | 6000 | 1.58 | 14.0 | 104.5 | 210.0 | 106.0 |
| E3 | 3.50 | 7.55 | 12000 | 1.57 | 14.1 | 104.3 | 209.5 | 105.7 |

*Largest Cross section area of the compacted part that carry magnetic flux.

As observed in table 5, the resistivity and core loss can be dramatically improved if the AD of the base powder is increased. The electrical resistivity of the compacted part is improved for higher AD, which results in improved core loss at higher operating frequencies (2 kHz) and/or for components with larger cross sections (20×20 mm).

Example 6

Example 6 shows the impact from using a 100 mesh iron powder having different apparent density, within and outside the specified apparent density, combined with the other features of the invention on the electric and magnetic properties of the compacted and heat treated parts. The starting powder used had an apparent density of about 3.0 g/ml.

An iron-based water atomised powder having an average particle size of about 95 μm and 10-30% less than 45 μm (100 mesh powder) was mechanically grinded. Four different apparent densities ranging from 2.96 to 3.57 g/ml are presented. The iron particles were after grinding surrounded by a phosphate-based electrically insulating coating (0.060% phosphorous by weight of the coated powder). The coated powder was further mixed by stirring with 0.2% by weight of an aminoalkyl-trialkoxy silane (Dynasylan®Ameo), and thereafter 0.15% by weight of an oligomer of an aminoalkyl/alkyl-alkoxy silane (Dynasylan®1146), both produced by Evonik Ind. The composition was further mixed with 0.2% by weight of a fine powder of bismuth (III) oxide. The powders were finally mixed with a particulate lubricant, EBS, before compaction. The amount of the lubricant used was 0.3% by weight of the composition. The powder compositions were further processed as described in example 1, except using only 1100 MPa and die temperature 100° C. The heat treatment was made at 665° C. for 35 minutes in nitrogen. Testing was performed according to example 1. Table 6 shows the obtained results.

TABLE 6

| Samples | AD (g/ml) | Ring Density [g/cm3] | Ring Resistivity [μOhm * m] | "New curve" B @ 10 kA/m [T] | Core loss @ 1 T and 400 Hz [W/kg] | Core loss @ 1 T and 1 kHz [W/kg] | Core loss @ 0.1 T and 10 kHz [W/kg] | Core loss @ 0.2 T and 5 kHz [W/kg] |
|---|---|---|---|---|---|---|---|---|
| F1 | 2.96 | 7.51 | 73 | 1.51 | 38.2 | 115.6 | 36.8 | 48.9 |
| F2 | 3.18 | 7.50 | 520 | 1.51 | 35.5 | 101.2 | 22.8 | 34.3 |
| F3 | 3.39 | 7.49 | 6319 | 1.51 | 35.8 | 101.3 | 21.5 | 32.8 |
| F4 | 3.57 | 7.50 | 7744 | 1.50 | 36.6 | 103.4 | 22.2 | 33.6 |

The resistivity and core loss magnetic properties of the 100 mesh powders can be significantly improved if the apparent density of the base powder is increased up to at least above about 3.3 g/ml. The core loss at higher operating frequencies (>1 kHz) is considerably decreased thanks to the improved electrical resistivity.

Example 7

Example 7 shows the impact from using a 200 mesh iron powder having different apparent density, within and outside the specified apparent density, combined with the other features of the invention on the electric and magnetic properties of the compacted and heat treated part. The starting powder used had an apparent density of about 3.0 g/ml.

An iron-based water atomised powder having an average particle size of about 40 μm and 60% less than 45 μm (200 mesh powder) was mechanically grinded and two different apparent densities are thus presented. The iron particles were thereafter surrounded by a phosphate-based electrically insulating coating (0.075% phosphorous by weight of the coated powder). The coated powder was further mixed by stirring with 0.25% by weight of an aminoalkyl-trialkoxy silane (Dynasylan®Ameo), and thereafter 0.15% by weight of an oligomer of an aminoalkyl/alkyl-alkoxy silane (Dynasylan®1146), both produced by Evonik Ind. The composition was further mixed with 0.3% by weight of a fine powder of bismuth (III) oxide. The powders were finally mixed with a particulate lubricant, EBS, before compaction. The amount of the lubricant used was 0.3% by weight of the composition.

The powder compositions were further processed as described in example 1, except using only 1100 MPa and die temperature 100° C. The heat treatment was made at 665° C. for 35 minutes in nitrogen. Testing was performed according to example 1. Table 7 shows the obtained results.

TABLE 7

| Sample | AD (g/ml) | Ring H5 mm Density (g/cm3) | Ring Resistivity (μOhm · m) | B @ 10 kA/m (T) | Core loss @ 1 T and 100 Hz (W/kg) | Core loss @ 0.1 T and 10 kHz (W/kg) | Core loss @ 0.2 T and 5 kHz (W/kg) |
|---|---|---|---|---|---|---|---|
| G1 | 3.01 | 7.40 | 300 | 1.36 | 9.2 | 35.0 | 55.0 |
| G2 | 3.45 | 7.40 | 6000 | 1.36 | 9.1 | 17.0 | 27.6 |

The resistivity and core loss of 200 mesh powders can be significantly improved if the apparent density of the base powder is increased up to at least above about 3.4 g/ml. The core loss at higher operating frequencies (>1 kHz) is considerably decreased thanks to the improved electrical resistivity.

The invention claimed is:

1. A ferromagnetic powder composition comprising soft magnetic iron-based core particles having an apparent density of 3.3-3.57 g/ml and having a rounded irregular shape or a generally spherical shape, and wherein the surface of the core particles is provided with a phosphorus-based inorganic insulating layer, and at least one metal-organic layer, located outside the first phosphorus-based inorganic insulating layer, of a metal-organic compound having the following general formula:

$$R_1[(R_1)_x(R_2)_y(MO_{n-1}]_nR_1$$

wherein:

M is a central atom selected from Si, Ti, Al, or Zr;

O is oxygen;

$R_1$ is an alkoxy group having less than 4 carbon atoms;

$R_2$ is an organic moiety and wherein at least one $R_2$ contains at least one amino group;

n is the number of repeatable units being an integer between 1 and 20;

x is an integer between 0 and 1;

y is an integer between 1 and 2.

2. The composition according to claim 1, wherein the $R_1$ is an alkoxy group having less than 3 carbon atoms.

3. The composition according to claim 1, wherein a metallic or semi-metallic particulate compound having a Mohs hardness of less than 3.5 being adhered to the at least one metal-organic layer.

4. Composition according to claim 3, wherein the metallic or semi-metallic particulate compound is bismuth.

5. The composition according to claim 3, wherein the composition comprises from 0.05 to 0.8 wt % of the metallic or semi-metallic particulate compound.

6. The composition according to claim 1, wherein the powder composition further comprises a particulate lubricant.

7. The composition according to claim 1, wherein the metal-organic compound in one metal-organic layer is a monomer (n=1).

8. The composition according to claim 1, wherein the metal-organic compound in one metal-organic layer is an oligomer (n=2-20).

9. The composition according to claim 8 wherein the oligomer of the metal-organic compound is selected from alkoxy-terminated amino-silsesquioxanes, amino-siloxanes, oligomeric 3-aminopropyl-alkoxy-silane, 3-aminopropyl/propyl-alkoxy-silane, N-aminoethyl-3-aminopropyl-alkoxy-silane, or N-aminoethyl-3-aminopropyl/methyl-alkoxy-silane, or mixtures thereof.

10. The composition according to claim 1, wherein the $R_2$ includes 1-6 carbon atoms.

11. The composition according to claim 1, wherein the $R_2$-group of the metal-organic compound includes one or more hetero atoms selected from the group consisting of N, O, S and P.

12. The composition according to claim 1, wherein the $R_2$ includes one or more of the following functional groups selected from the group consisting of amine, diamine, amide, imide, epoxy, mercapto, disulfido, chloroalkyl, hydroxyl, ethylene oxide, ureido, urethane, isocyanato, acrylate and glyceryl acrylate.

13. The composition according to claim 1, wherein the metal-organic compound is a monomer selected from trialkoxy and dialkoxy silanes, titanates, aluminates or zirconates.

14. The composition according to claim 1, wherein the metal-organic compound is an oligomer selected from alkoxy-terminated alkyl/alkoxy oligomers of silanes, titanates, aluminates or zirconates.

15. The composition according to claim 1, wherein the apparent density of the base powder has been increased between at least 7-25% by grinding, milling or other processes which will physically alter the irregular surface.

16. The composition according to claim 1, wherein the core particles have a spherical shape.

17. The composition according to claim 1, wherein the core particles have an apparent density of 3.4-3.55 g/ml.

18. The composition according to claim 1, wherein the core particles have been subjected to a processes to physically alter the surface of the core particles.

19. The composition according to claim 1, wherein the at least one metal-organic layer comprises a first metal-organic layer including a monomer of the metal-organic compound and a second metal-organic layer including an oligomer of the metal-organic compound, wherein said second layer is outside said first layer.

20. The composition according to claim 19, wherein a ratio by weight of the first metal-organic layer to the second metal-organic layer is between 1:0 and 1:2.

21. The composition according to claim 19, wherein a ratio by weight of the first metal-organic layer to the second metal-organic layer is between 2:1 and 1:2.

22. The composition according to claim 1, wherein the composition comprises from 0.05 to 0.8 wt % total of the metal-organic compound.

* * * * *